US012766961B2

(12) United States Patent
Koseki

(10) Patent No.: US 12,766,961 B2
(45) Date of Patent: Oct. 20, 2026

(54) DISPLAY APPARATUS

(71) Applicant: DENSO TEN Limited, Kobe (JP)

(72) Inventor: Tomohisa Koseki, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 19/192,868

(22) Filed: Apr. 29, 2025

(65) Prior Publication Data

US 2026/0109228 A1 Apr. 23, 2026

(30) Foreign Application Priority Data

Oct. 17, 2024 (JP) ................................ 2024-181550

(51) Int. Cl.
*B60K 35/22* (2024.01)
*B60K 35/65* (2024.01)

(52) U.S. Cl.
CPC ............ *B60K 35/656* (2024.01); *B60K 35/22* (2024.01); *B60K 2360/1526* (2024.01); *B60K 2360/23* (2024.01)

(58) Field of Classification Search
CPC .................. B60K 35/656; B60K 35/22; B60K 2360/1526; B60K 2360/23
USPC ........................................................ 348/837
See application file for complete search history.

(56) References Cited

U.S. PATENT DOCUMENTS

2017/0359558 A1* 12/2017 Harada ................ B60K 35/213

OTHER PUBLICATIONS

Moriwaki, Minoru. "Bentley Announce "Rotation Display" Technology; Adopted for New Flying Spur." 2020.
Japan Display Inc. "Development of transparent display monitor [Rælclear™] to facilitate communication with deaf people, impairment, and elderly people, and launch project with support purchase service [Makuake]." 2021.

* cited by examiner

*Primary Examiner* — Nguyen T Truong
(74) *Attorney, Agent, or Firm* — Oliff PLC

(57) ABSTRACT

A display apparatus with a structure of a triangular prism that has a first side surface, a second side surface, and a third side surface parallel to a central axis of the triangular prism. The display apparatus includes: a mirror being provided on a side of a back surface of the first side surface of the triangular prism, the back surface of the first side surface facing an inside of the triangular prism; a display provided on the second side surface, the display visually recognizable from the inside of the triangular prism; and a transparent window provided on the third side surface.

9 Claims, 9 Drawing Sheets

DISPLAY APPARATUS

BACKGROUND OF THE INVENTION

Field of the Invention

The invention relates to a display apparatus and a displaying method.

Description of the Background Art

The use of in-vehicle displays is expanding to include display apparatuses for passenger seats. However, when a driver looks at a display apparatus for a passenger seat, it is assumed that a line of sight of the driver is deviated from a traveling direction, resulting in inattentive driving.

In order to cope with such a problem, for example, it is considered that a display of the display apparatus for the passenger seat is turned off during traveling of a vehicle.

Alternatively, it is considered that a filter with a louver structure is provided on the display apparatus for the passenger seat, and the display apparatus for the passenger seat is not easily viewed from a lateral direction so that the inattentive driving of the driver is suppressed. Moreover, for example, it is also considered that when the line of sight of the driver is detected and directed to a side of the passenger seat, the display of the display apparatus is turned off, or control linked to line-of-sight detection, such as darkening the display, is performed.

However, when the display of the display apparatus for the passenger seat is turned off, the display apparatus for the passenger seat does not achieve a primary purpose for an occupant in the passenger seat. Furthermore, even when the filter with the louver structure is provided, the display apparatus for the passenger seat cannot be made completely invisible from the lateral direction. Moreover, regarding the control linked to the line-of-sight detection, for example, when the driver looks at a door mirror, since the same line of sight as the line of sight directed to the display apparatus for the passenger seat is detected, this control may be frequently activated. Thus, the passenger may feel annoyed.

SUMMARY OF THE INVENTION

According to one aspect of the invention, a display apparatus with a structure of a triangular prism that has a first side surface, a second side surface, and a third side surface parallel to a central axis of the triangular prism. The display apparatus includes: a mirror being provided on a side of a back surface of the first side surface of the triangular prism, the back surface of the first side surface facing an inside of the triangular prism; a display provided on the second side surface, the display visually recognizable from the inside of the triangular prism; and a transparent window provided on the third side surface.

It is an object of the invention to provide a display apparatus capable of suppressing an influence of a display of the display apparatus for an occupant in a passenger seat on a driver of a vehicle while the vehicle is travelling, and sufficiently exhibiting a function of the display apparatus for the occupant in the passenger seat.

These and other objects, features, aspects and advantages of the invention will become more apparent from the following detailed description of the invention when taken in conjunction with the accompanying drawings.

DESCRIPTION OF THE EMBODIMENTS

Hereinafter, a display apparatus 10 and a displaying method according to an embodiment will be described with reference to the accompanying drawings.

Outline

Figure 1A:
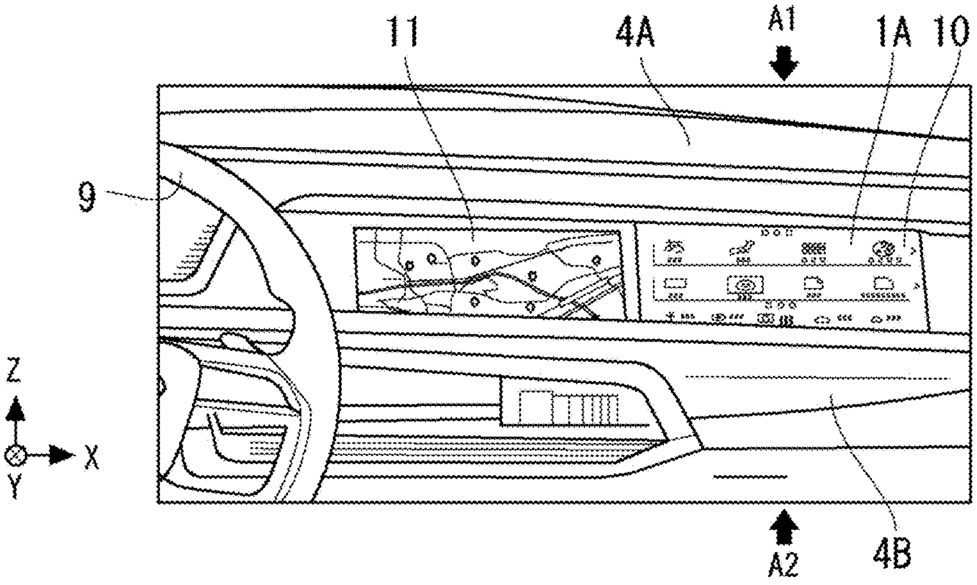
FIG. 1A illustrates a display apparatus fitted into a dashboard of a vehicle.
Figure 1B:
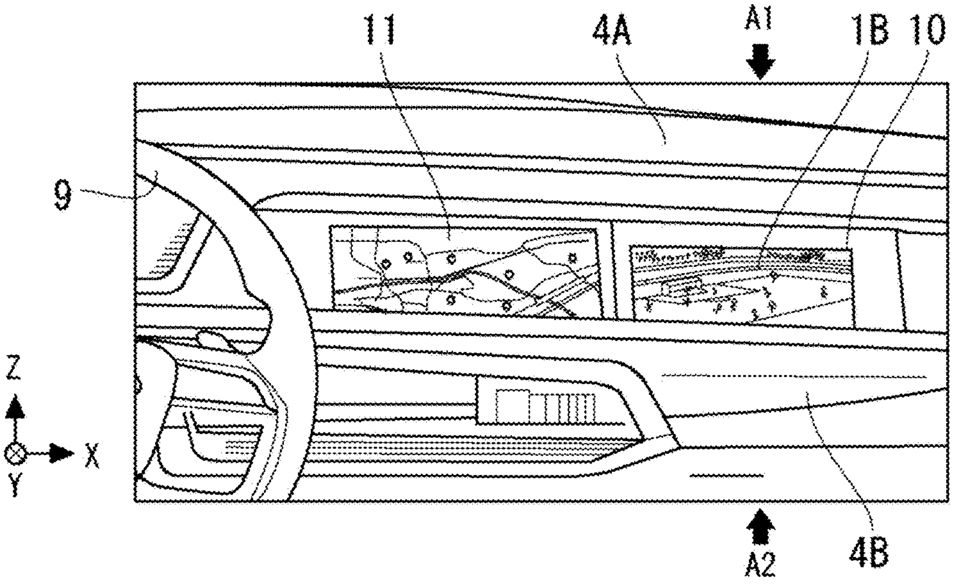
FIG. 1B illustrates the display apparatus fitted into the dashboard of the vehicle.
Figure 1C:
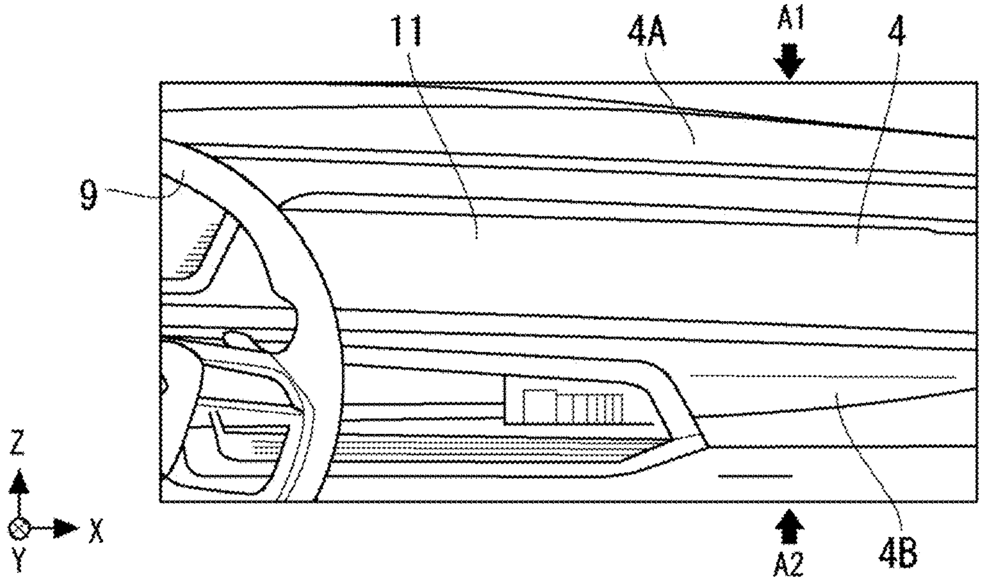
FIG. 1C illustrates the display apparatus fitted into the dashboard of the vehicle.

Each of FIG. 1A to FIG. 1C illustrates the display apparatus 10 fitted into a dashboard of a vehicle. Here, in this embodiment, all interior parts in front of a driver seat and a passenger seat of a vehicle are referred to as the "dashboard". An area of the dashboard into which a display, an instrument, and the like, are fitted is referred to as an "instrument panel". However, the names are not limited thereto. For example, the whole dashboard may be referred to as the "instrument panel".

In this embodiment, in a vehicle width direction, coordinates directed from a left side to a right side of the vehicle are referred to as X coordinates. Coordinates directed in a traveling direction when the vehicle travels forward are referred to as Y coordinates. Coordinates directed from a bottom to a ceiling of the vehicle in a vertical direction are referred to as Z coordinates.

FIG. 1A is a display example of the display apparatus 10 while the vehicle is stopped. FIG. 1B is a display example of the display apparatus 10 while the vehicle is traveling. FIG. 1C illustrates a state in which the display apparatus 10 is covered with a same material (hereinafter, a skin member 4) as that of a surface of the dashboard. In each of FIG. 1A to FIG. 1C, a display apparatus 11 for a driver is adjacently disposed on a right side of a steering wheel 9, and the display apparatus 10 for the passenger seat is adjacently disposed on a right side of the display apparatus 11.

That is, in this embodiment, for example, the display apparatus 10 to be used for a left-hand drive vehicle is exemplified. However, the use of the display apparatus 10 is not limited to the left-hand drive vehicle. For example, in the case of a right-hand drive vehicle, the display apparatus 11 for the driver is adjacently disposed on a left side of the steering wheel 9. Furthermore, the display apparatus 10 for the passenger seat may be adjacently disposed on a left side of the display apparatus 11. In each of FIG. 1A to FIG. 1C, both the display apparatuses 10, 11 are fitted into between an upper panel 4A and a lower panel 4B. Materials of surfaces of the upper panel 4A and the lower panel 4B are the same as that of the surface of the dashboard (or instrument panel).

The display apparatus 11 for the driver displays information for the driver. Examples of the information for the driver include map information, navigation information, environmental information, such as temperature, warning information showing abnormality of the vehicle, and the like. In each of FIG. 1A to FIG. 1C, instruments, such as a speed meter, are disposed in front of the steering wheel 9.

The display apparatus 10 for the passenger seat displays information for an occupant in the passenger seat. The information for the occupant in the passenger seat is, for example, infotainment, which is a blend of information and entertainment. Therefore, the display apparatus 10 for the passenger seat may implement a car audio, a video, internet browsing, connection with a smartphone, a computer game, and the like, which are called in-vehicle infotainment (IVI).

In this embodiment, the display apparatus 10 for the passenger seat switches among three display states. That is, the display apparatus 10 has a transparent plate display panel (hereinafter, referred to as a transparent display 1) capable of displaying on both a front surface 1A and a back surface 1B (refer to FIG. 2A to FIG. 2C, and FIG. 3). The display apparatus 10 switches a display surface of the transparent display 1, and a way of displaying (hereinafter, referred to as a display state) according to a traveling state of the vehicle whether the vehicle is traveling or not).

A first display state is a display state while the vehicle is stopped (FIG. 1A). In the first display state, in the display apparatus 10, the front surface 1A of the transparent display 1 is exposed to a space between the upper panel 4A and the lower panel 4B as it is. In the first display state, the driver as well as the occupant in the passenger seat visually recognize a display content of the display apparatus 10. Therefore, in the first display state, the display apparatus 10 may display any information, in addition to the infotainment.

A second display state is a display state while the vehicle is traveling (FIG. 1B). In the second display state, the display apparatus 10 displays the back surface 1B of the display apparatus 10 via a mirror 2 (refer to FIG. 2A to FIG. 2C). In the second display state, in the display apparatus 10, a window 3 (refer to FIG. 2A to FIG. 2C) made of a transparent material (e.g., glass, resin, etc.) is disposed in the space between the upper panel 4A and the lower panel 4B. The display apparatus 10 displays the back surface 1B of the transparent display 1 via the mirror 2 disposed on a deeper side than the window 3 in a space 5 inside the dashboard (or instrument panel). The display content on the back surface 1B of the transparent display 1 mirror-reversed on the mirror 2 is formed as an image on a deeper side (a front side of the vehicle) than the mirror 2 inside the dashboard (or instrument panel). Thus, in the second display state, a line of sight of the driver is obstructed by the dashboard and the driver does not visually recognize the display content of the display apparatus 10.

In a third display state, the display apparatus 10 is covered with the skin member 4 whose material is the same as that of the surface of the dashboard. In this state, the display apparatus 10 does not provide the infotainment and other information to the driver and the occupant in the passenger seat. When the display apparatus 10 provides no information, since the skin member 4 whose material is the same as that of the surface of the dashboard is exposed, the design of the dashboard is uniformed, which results in improving designability.

Configuration

Figure 2A:
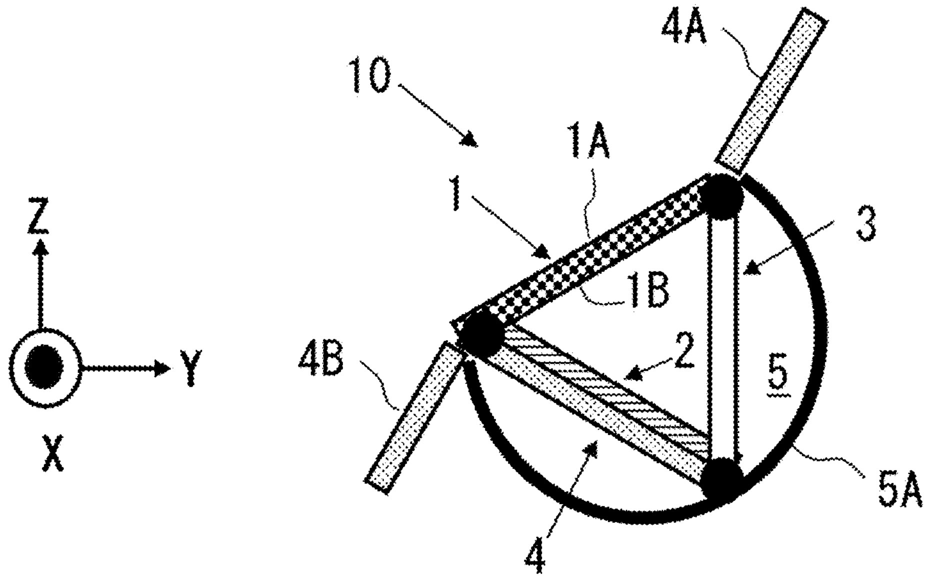
FIG. 2A illustrates a structure of the display apparatus.
Figure 2B:
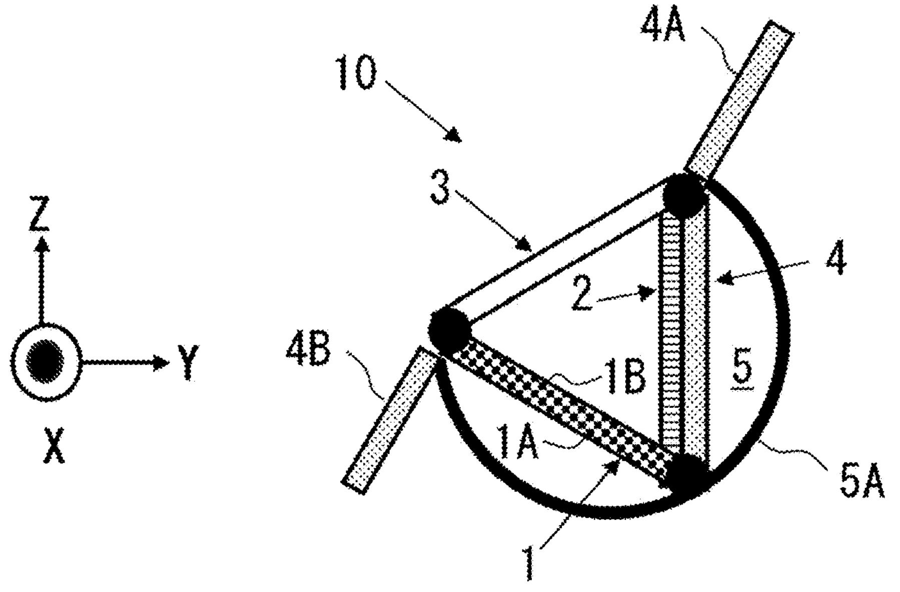
FIG. 2B illustrates the structure of the display apparatus.
Figure 2C:
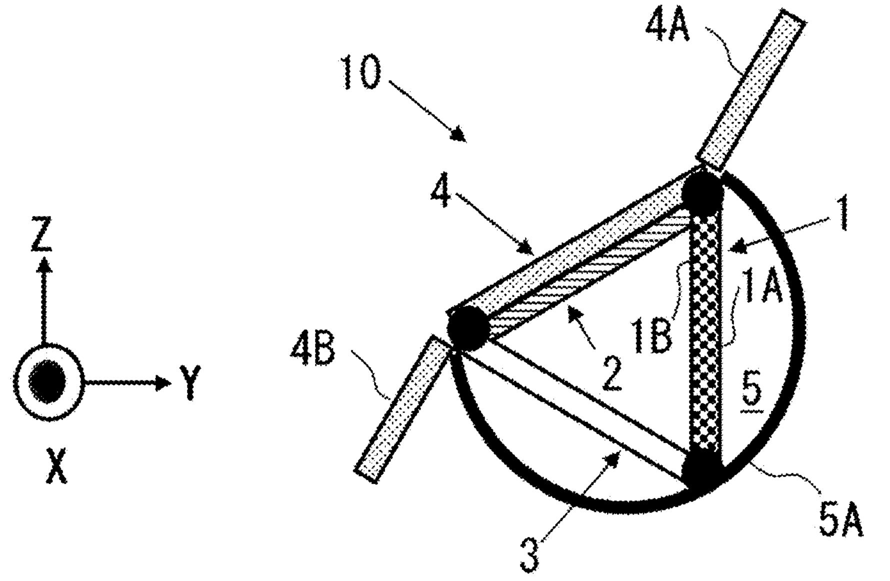
FIG. 2C illustrates the structure of the display apparatus.

Each of FIG. 2A to FIG. 2C illustrates a structure of the display apparatus 10. Each of FIG. 2A to FIG. 2C illustrates a cross-section of the display apparatus 10 in each of the display states shown in FIG. 1A to FIG. 1C. Each of FIG. 2A to FIG. 2C is a cross-sectional view obtained by cutting the display apparatus 10 along a plane parallel to a YZ plane (plane including front and vertical directions of the vehicle) including arrows A1, A2 shown in FIG. 1A to FIG. 1C. However, each of FIG. 2A to FIG. 2C also illustrates the upper panel 4A and the lower panel 4B. Therefore, in FIG. 2A to FIG. 2C, an upward direction toward the paper surface is a Z-axis direction (a direction toward the ceiling from the bottom of the vehicle). A direction from the paper surface toward a front side (observer) is an X-axis direction (direction from the left side to the right side of the vehicle). Furthermore, a right direction toward the paper surface is a Y-axis direction (traveling direction of the vehicle during forward traveling).

As illustrated in FIG. 2A to FIG. 2C, the display apparatus 10 with a triangular prism structure has an equilateral triangular cross section. That is, the display apparatus 10 has a first side surface, a second side surface, and a third side surface parallel to a central axis of the triangular prism. Each of FIG. 2A to FIG. 2C illustrates a triangular cross section cut by a plane perpendicular to the central axis.

The display apparatus 10 is embedded and housed in the space 5 behind the dashboard including the upper panel 4A and the lower panel 4B. The space 5 behind the dashboard is tubular and partitioned with a partition member 5A having an arc-shaped cross section. A part of a side surface (cylindrical surface) of a tube body is cut by a plane parallel to the central axis to obtain the partition member 5A. The partition member 5A has an opening between the upper panel 4A and the lower panel 4B.

The display apparatus 10 with the triangular prism structure is supported inside the dashboard to rotate around the central axis of the triangular prism structure in the space 5. Therefore, in the display apparatus 10 with the triangular prism structure, one of three side surfaces parallel to the central axis of the triangular prism forming the triangular prism is exposed to the opening between the upper panel 4A and the lower panel 4B.

FIG. 2A illustrates the structure of the display apparatus 10 in the first display state. In the first display state, the front surface 1A of the transparent display 1 is exposed to the opening between the upper panel 4A and the lower panel 4B. Therefore, in the first display state, the driver and the occupant in the passenger seat visually recognize the display content, such as an image to be formed on the front surface 1A of the transparent display 1.

In the transparent display 1, the display content, such as the image to be formed on the front surface 1A, is displayed reversed on the back surface 1B. Among the three side surfaces of the triangular prism, the side surface on which the transparent display 1 is provided is referred to as the "second side surface". Therefore, the transparent display 1 visually recognizable from a side of an inner surface of the triangular prism is provided on the second side surface.

FIG. 2B illustrates the structure of the display apparatus 10 in the second display state. Since the display apparatus 10 is rotated 120 degrees anticlockwise toward the paper surface around the central axis of the triangular prism, the display apparatus 10 is brought into the second display state (FIG. 2B). In the second display state, the transparent window 3 is disposed in the opening between the upper panel 4A and the lower panel 4B. Among the three side surfaces of the triangular prism, the side surface of the transparent window 3 is referred to as the "third side surface".

In the second display state, the transparent display 1 is positioned vertically lower (a negative Z-axis direction side) than the transparent window 3 in the space 5 inside the dashboard. The front surface 1A of the transparent display 1 faces vertically downward. Therefore, in the second display state, the driver and the occupant in the passenger seat do not visually recognize the display content, such as the image to be formed on the front surface 1A of the transparent display 1. However, in the second display state, the back surface 1B of the transparent display 1 faces vertically upward (a positive Z-axis direction) in an inner space of the triangular prism.

In the second display state, the mirror 2 is disposed to face the inner space of the triangular prism on the deeper side (a positive Y-axis direction, a front direction of the vehicle) than the transparent window 3 when viewed from the passenger seat. At this time, the occupant in the passenger seat visually recognizes the image reflected in the mirror 2 through the transparent window 3. The display content on the back surface 1B of the transparent display 1 is mirror-reversed on the mirror 2. The display content on the back surface 1B of the transparent display 1 is obtained by reversing the display content on the front surface 1A. Therefore, the occupant in the passenger seat visually recognizes the display content on the front surface 1A of the transparent display 1 through the transparent window 3 and the mirror 2. In the second display state, the line of sight of the driver is obstructed by the dashboard and the driver does not visually recognize the image reflected in the mirror 2 (refer to FIG. 5B).

In the display apparatus 10, the mirror 2 is bonded to the skin member 4. A material of the skin member 4 of the dashboard is the same as or similar to those of the upper panel 4A, the lower panel 4B, and the like. The surface of the triangular prism obtained by bonding the mirror 2 and the skin member 4 is referred to as the "first side surface". That is, the first side surface has a structure in which the skin member 4 of the dashboard whose material is the same as or similar to those of the upper panel 4A, the lower panel 4B, and the like, is bonded to the mirror 2. The mirror 2 is oriented to reflect light on a side of the central axis of the triangular prism (inner space). On the other hand, the skin member 4 of the dashboard covers the first side surface (outer surface) of the triangular prism. When a material of the instrument panel is different from that of the dashboard except the instrument panel, a skin member of the instrument panel may be bonded to the mirror 2. That is, the mirror 2 may be bonded to the skin member of the instrument panel or the skin member 4 of the dashboard including the instrument panel.

FIG. 2C illustrates the structure of the display apparatus 10 in the third display state. Since, from the display state of FIG. 2B, the display apparatus 10 is rotated 120 degrees anticlockwise toward the paper surface around the central axis of the triangular prism, the display apparatus 10 is brought into the third display state (FIG. 2C). In the third display state, the skin member 4 of the dashboard is disposed in the opening between the upper panel 4A and the lower panel 4B. Therefore, in the third display state, the driver and the occupant in the passenger seat do not visually recognize the display content of the display apparatus 1. That is, a back surface of the mirror 2 is covered with the same material as that of the instrument panel or the dashboard including the instrument panel to form the front surface of the first side surface. Since a front surface of the first side surface is exposed from the instrument panel, the opening of the instrument panel for embedding the display apparatus 10 is closed with the same material as that of the instrument panel or the dashboard including the instrument panel.

Figure 3:
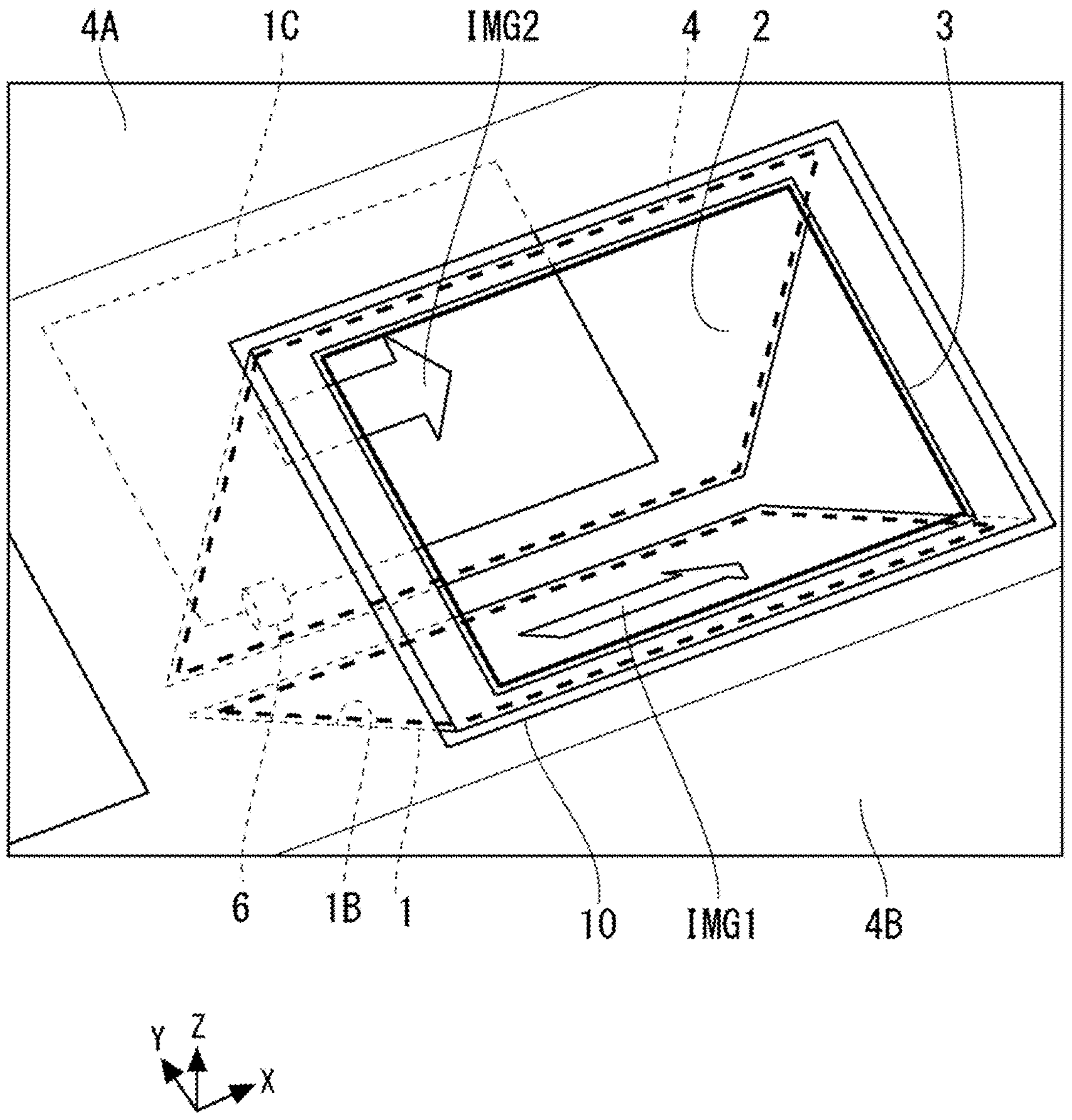
FIG. 3 is a perspective view illustrating a configuration of the display apparatus.

FIG. 3 is a perspective view illustrating a configuration of the display apparatus 10. FIG. 3 illustrates the display apparatus 10 in the second display state shown in FIG. 2B. In FIG. 3, the X, Y, and Z-axis directions are the same as those in FIG. 1A to FIG. 1C, and FIG. 2A to FIG. 2C. Each of the back surface 1B of the transparent display 1 and the mirror 2 fitted into the triangular prism structure is illustrated by a thick dotted line frame. On the other hand, the transparent window 3 is illustrated by a thin solid line frame. The image (hereinafter, a virtual image surface 1C) of the display content on the back surface 1B of the display apparatus 10 reflected in the mirror 2 is illustrated by a thin dotted line frame.

That is, in FIG. 3, the transparent window 3 is disposed in the opening between the upper panel 4A and the lower panel 4B. The mirror 2 is disposed on the deeper side than the transparent window 3 (a positive Y-axis direction side, the front side of the vehicle). As described in FIG. 2A to FIG. 2C, the skin member 4 of the dashboard is bonded to the mirror 2. On the other hand, the back surface 1B of the transparent display 1 is disposed facing upward (the positive Z-axis direction) on the deeper and lower sides (the negative Z-axis direction side) than the transparent window 3.

In an example of FIG. 3, an arrow image (IMG1) is formed on the back surface 1B of the transparent display 1. The whole back surface 1B is mirror-reversed on the mirror 2 and reflected on the virtual image surface 1C on the deeper side (the positive Y-axis direction side, the front side of the vehicle) than the mirror 2 when viewed from the passenger seat. The occupant in the passenger seat visually recognizes a virtual image (IMG2) of the arrow image (IMG1) reflected on the virtual image surface 1C through the window 3. FIG. 3 illustrates the transparent display 1 including the back surface 1B and the mirror 2 that are separated each other. However, FIG. 3 is merely an example for easily understanding the virtual image surface 1C. That is, for example, as illustrated in FIG. 2A to FIG. 2C, the transparent display 1 including the back surface 1B (the second side surface) and the mirror 2 (the first side surface) may be in contact with each other to form a ridge line of the triangular prism.

As described above, the triangular prism structure of the display apparatus 10 has the first side surface, the second side surface, and the third side surface parallel to the central axis. Each of both bottom surfaces perpendicular to the central axis of the triangular prism, which is formed on both sides of each of the first side surface, the second side surface, and the third side surface, has an equilateral triangular shape. Furthermore, on each of the both bottom surfaces, a rotation axis 6 that rotatably supports the display apparatus 10 with the triangular prism structure around the central axis is provided at a position of a center of gravity of the equilateral triangular shape. The rotation axis 6 is, for example, supported by a bearing hole and rotatable around the central axis.

Action

Figure 4A:
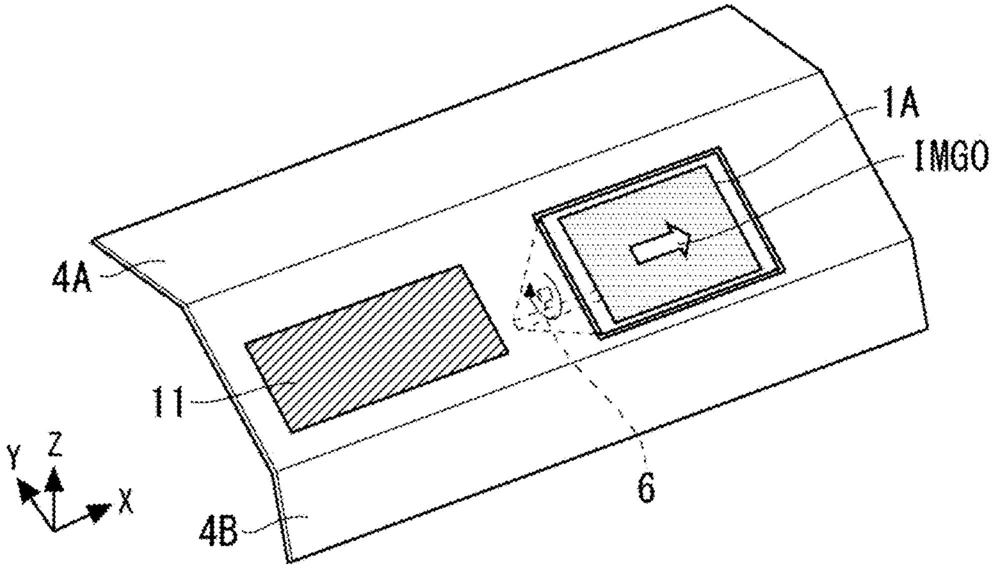
FIG. 4A illustrates a displaying state of the display apparatus for an occupant in a passenger seat.
Figure 4B:
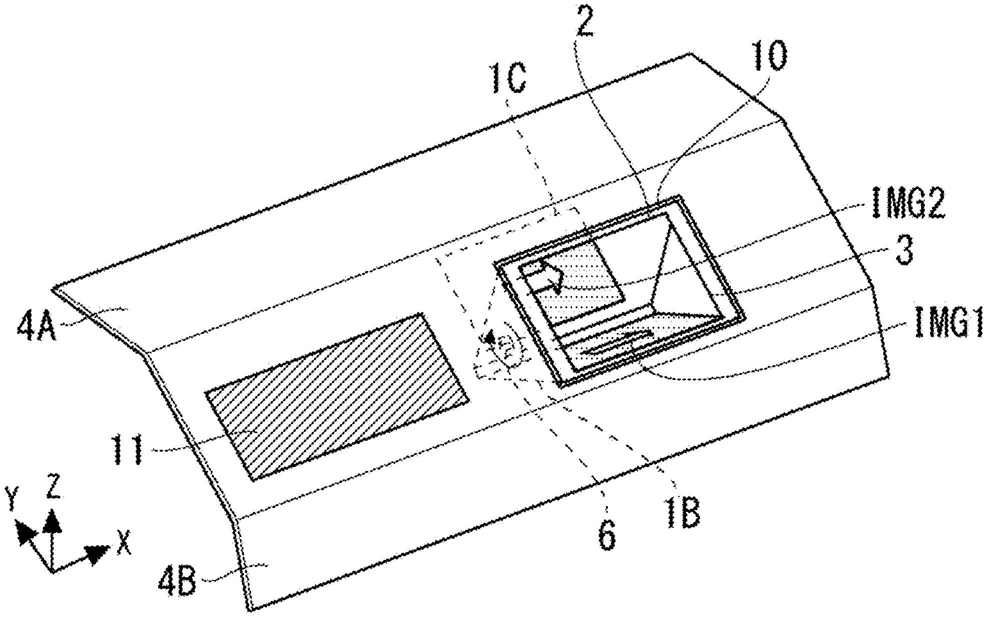
FIG. 4B illustrates a displaying state of the display apparatus for the occupant in the passenger seat.
Figure 4C:
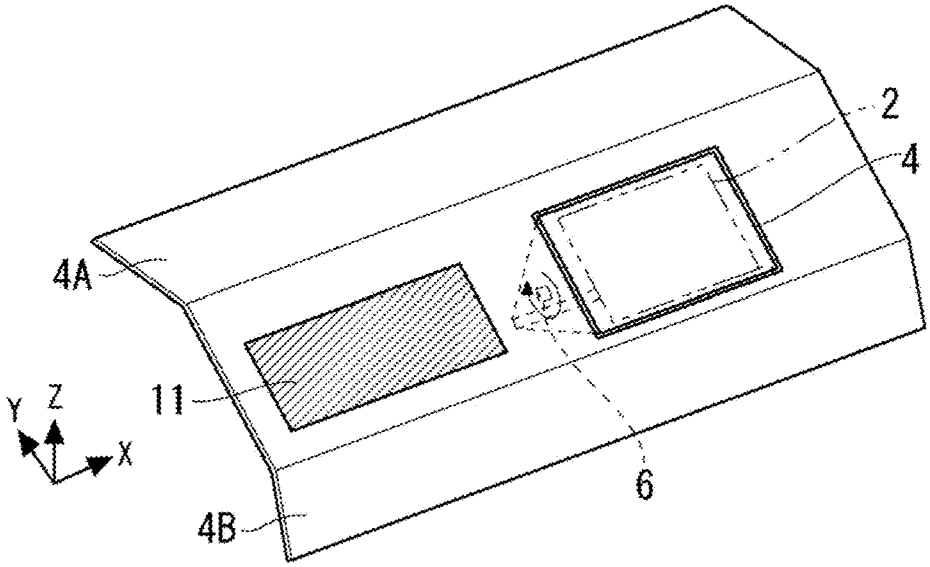
FIG. 4C illustrates a displaying state of the display apparatus for the occupant in the passenger seat.

Each of FIG. 4A to FIG. 4C illustrates a display state of the display apparatus 10 for the occupant in the passenger seat. The display states of the FIG. 4A to FIG. 4C correspond to the display states of FIG. 1A to FIG. 1C and the display states of FIG. 2A to FIG. 2C, respectively. A display content of the display apparatus 11 is not limited to those illustrated in FIG. 4A to FIG. 4C.

FIG. 4A is a display example of the display apparatus 10 in the first display state. The first display state is a display state while the vehicle is stopped. As described in FIG. 2A, in the first display state, the front surface 1A of the transparent display 1 is exposed to the opening between the upper panel 4A and the lower panel 4B. In an example of FIG. 4A, an image including an arrow image (IMG0) is displayed on the front surface 1A of the transparent display 1. Therefore, while the vehicle is stopped, the driver and the occupant in the passenger seat visually recognize the arrow image (IMG0) to be formed on the front surface 1A of the transparent display 1.

FIG. 2B is a display example of the display apparatus 10 in the second display state. The second display state is a display state while the vehicle is traveling. As described in FIG. 2B, in the second display state, the transparent window 3 is disposed in the opening between the upper panel 4A and the lower panel 4B.

As described in FIG. 2B, in the second display state, the back surface 1B of the transparent display 1 faces vertically upward (the positive Z-axis direction) in the inner space of the triangular prism. In the second display state, the mirror 2 is disposed to face the inner space of the triangular prism on the deeper side (the positive Y-axis direction, the front direction of the vehicle) than the transparent window 3 when viewed from the passenger seat. At this time, the occupant in the passenger seat visually recognizes the image reflected in the mirror 2 through the transparent window 3.

In an example of FIG. 4B, the image including the arrow image (IMG0) on the front surface 1A shown in FIG. 4A is reversed to become an image including the arrow image (IMG1) and is displayed on the back surface 1B. The image including the arrow image (IMG1) to be displayed on the back surface 1B is mirror-reversed on the mirror 2 to become the virtual image surface 1C and is reflected in the mirror 2. Therefore, the occupant in the passenger seat visually recognizes the arrow image (IMG2) obtained by mirror-reversing the arrow image (IMG1) on the back surface 1B on the virtual image surface 1C reflected in the mirror 2 and mirror-reversed through the window 3. The arrow image (IMG2) on the virtual image surface 1C is the same as the arrow image (IMG0) to be displayed on the front surface 1A.

FIG. 4C illustrates a structure of the display apparatus 10 in the third display state. As described in FIG. 2C, in the third display state, the skin member 4 of the dashboard is disposed in the opening between the upper panel 4A and the lower panel 4B. As described in FIG. 2A to FIG. 2C, the mirror 2 is bonded to a back surface of the skin member 4. Therefore, in the third display state, the driver and the occupant in the passenger seat do not visually recognize the display content of the display apparatus 10.

Figure 5A:
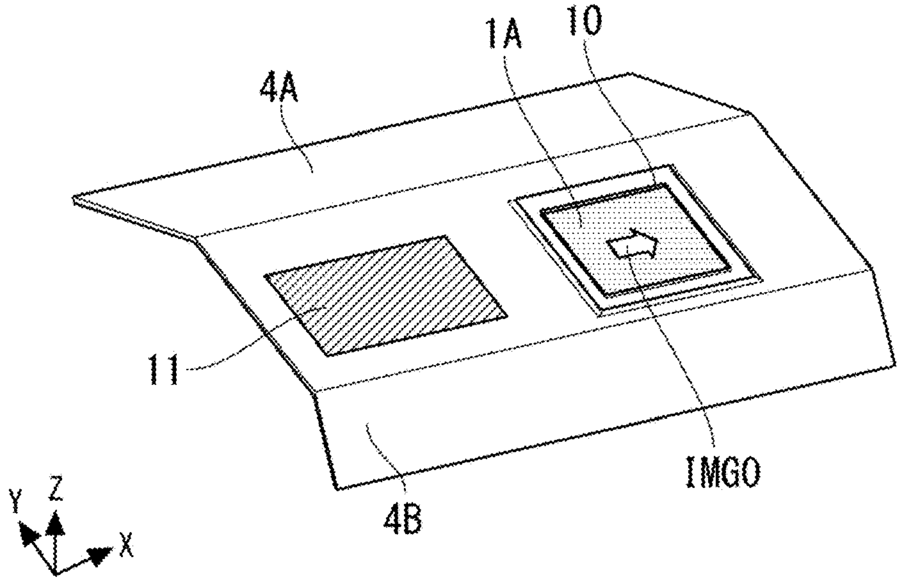
FIG. 5A illustrates a displaying state of the display apparatus for a driver.
Figure 5B:
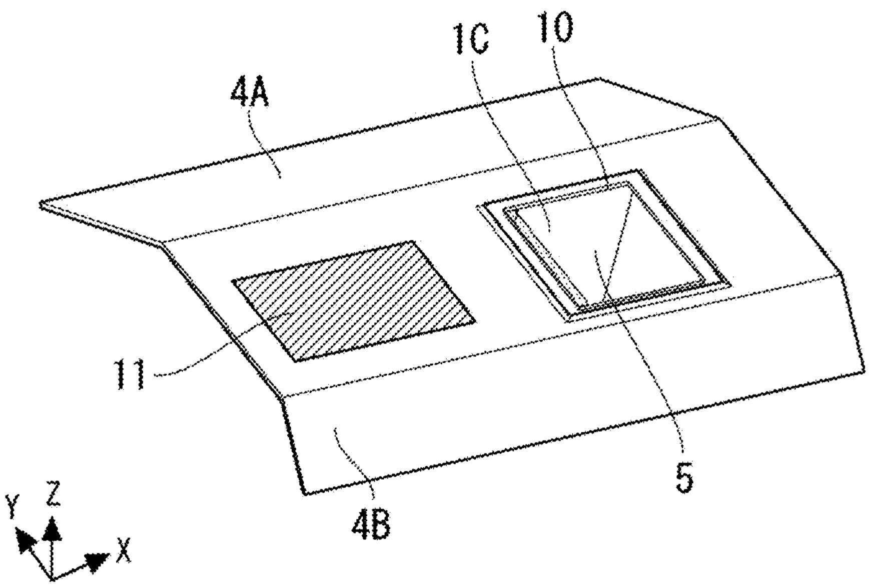
FIG. 5B illustrates a displaying state of the display apparatus for the driver.
Figure 5C:
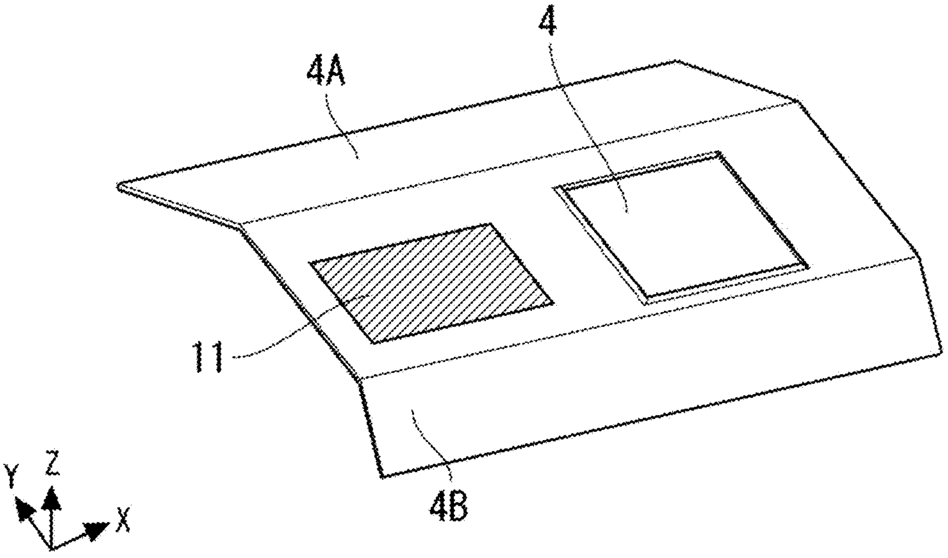
FIG. 5C illustrates a displaying state of the display apparatus for the driver.

Each of FIG. 5A to FIG. 5C illustrates a display state of the display apparatus 10 for the driver. The display states of FIG. 5A to FIG. 5C are the same as those of FIG. 4A to FIG. 4C, respectively. FIG. 5A is a display example of the display apparatus 10 in the first display state. The first display state is a display state while the vehicle is stopped. As described in FIG. 2A and FIG. 4A, in the first display state, the front surface 1A of the transparent display 1 is exposed to the opening between the upper panel 4A and the lower panel 4B. Therefore, the driver visually recognizes the display contents of both of the display apparatus 11 adjacent to a front right side of the driver (a right side of the steering wheel 9 of FIG. 1) and the display apparatus 10 adjacent to a right side of the display apparatus 10. The display state of FIG. 5 is the same as that of FIG. 4C. In the third display state, the driver and the occupant in the passenger seat do not visually recognize the display content of the display apparatus 10.

FIG. 5B is a display example of the display apparatus 10 in the second display state. The second display state is a display state while the vehicle is traveling. As described in FIG. 4B, in the second display state, the image including the arrow image (IMG0) displayed on the front surface 1A shown in FIG. 4A is reversed to become the image including the arrow image (IMG1) and is displayed on the back surface 1B. The image including the arrow image (IMG1) on the back surface 1B is mirror-reversed on the mirror 2 to become the virtual image surface 1C and is reflected in the mirror 2. In this case, the occupant in the passenger seat visually recognizes the arrow image (IMG2) obtained by mirror-reversing the arrow image (IMG1) on the back surface 1B on the virtual image surface 1C reflected in the mirror 2 and mirror-reversed through the window 3.

However, as in FIG. 5B, when the driver looks at the display apparatus 10, since the virtual image surface 1C is hidden by the dashboard, the driver does not visually recognize the virtual image surface 1C. The virtual image surface 1C reflected in the mirror 2 and mirror-reversed through the window 3 is formed in a position symmetrical to the back surface 1B of the transparent display 1 with the mirror 2 as a symmetrical central plane on the deeper side (the positive Y-axis direction side, i.e., the front side of the vehicle) than the mirror 2 (refer to FIG. 4B).

Figure 6A:
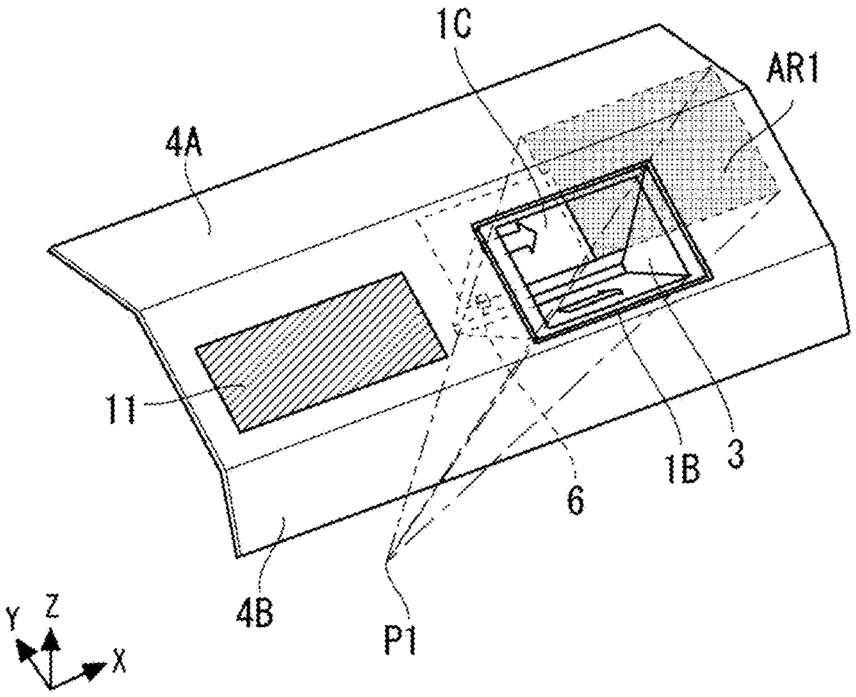
FIG. 6A illustrates a relationship among a user's viewpoint, a visual angle, and a virtual image surface.
Figure 6B:
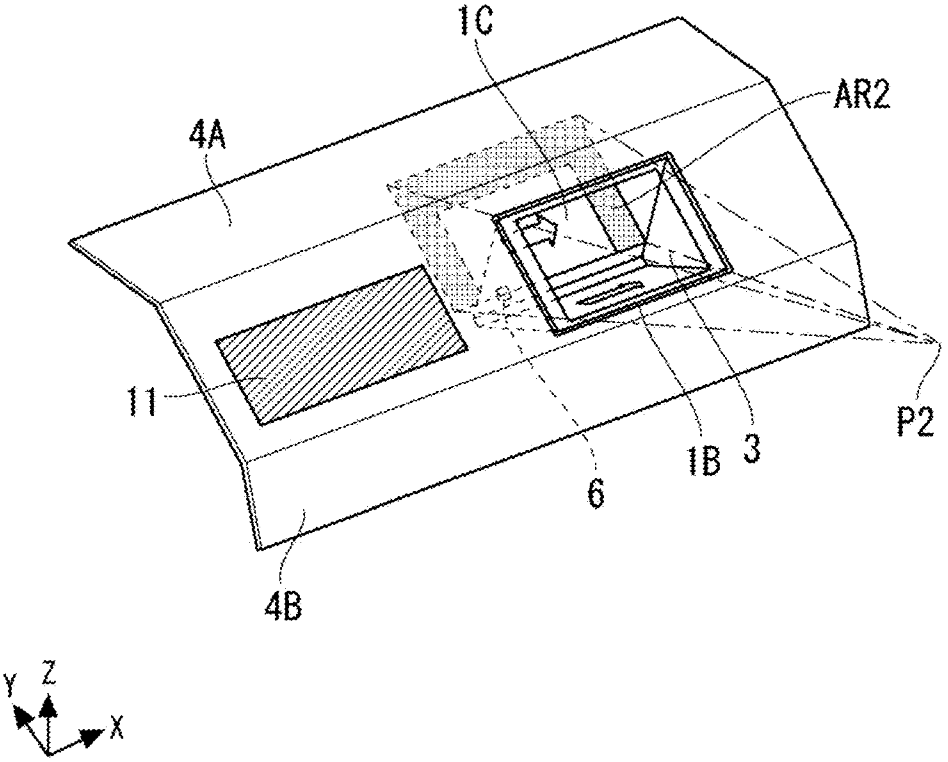
FIG. 6B illustrates a relationship among a user's viewpoint, a visual angle, and a virtual image surface.
Figure 7A:
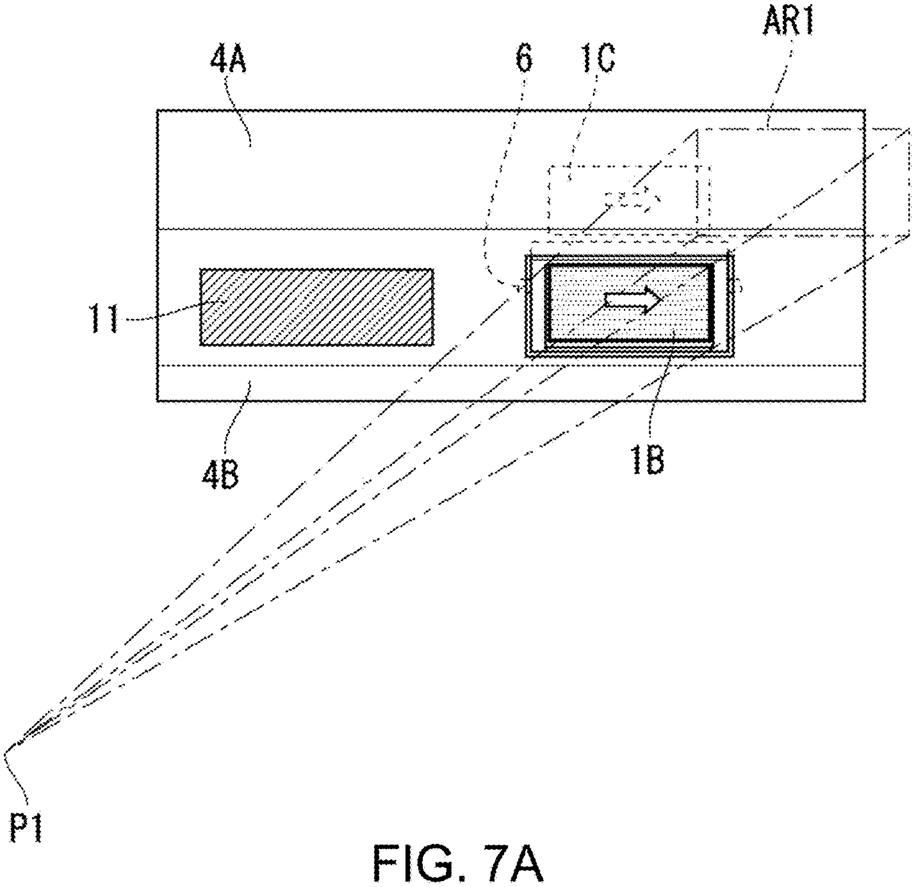
FIG. 7A illustrates a relationship among a user's viewpoint, a visual angle, and a virtual image surface.
Figure 7B:
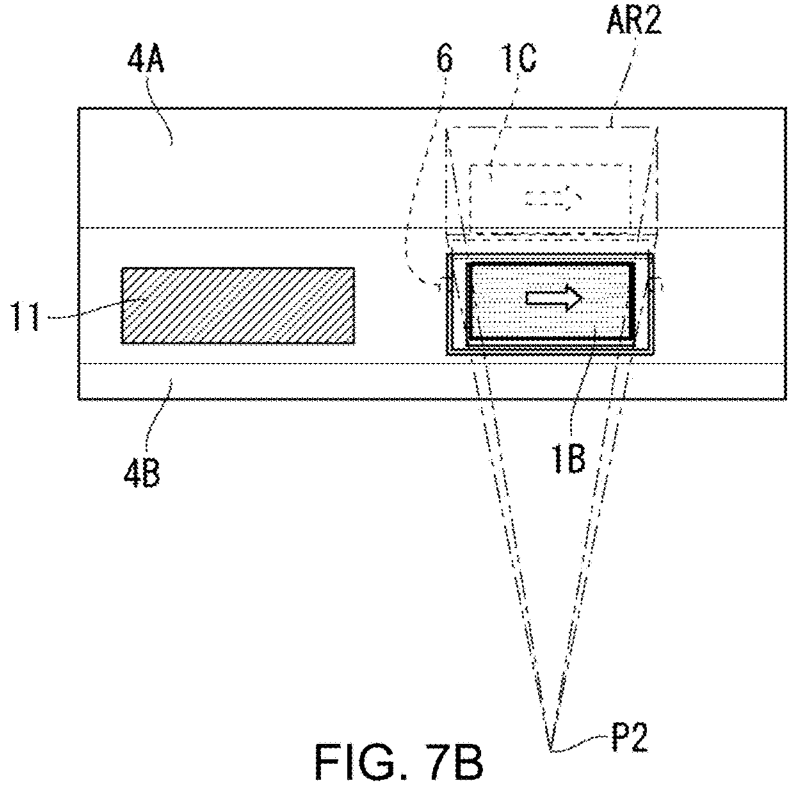
FIG. 7B illustrates a relationship among a user's viewpoint, a visual angle, and a virtual image surface.

Each of FIG. 6A to FIG. 6B and FIG. 7A to FIG. 7B illustrates a relationship among a user's viewpoint, a visual angle, and the virtual image surface 1C. Here, a user is the driver or the occupant in the passenger seat. Each of FIG. 6A to FIG. 6B is a perspective view illustrating the above relationship, and each of FIG. 7A to FIG. 7B is a front view illustrating the above relationship.

Each of FIG. 6A and FIG. 7A illustrates a viewpoint P1 of the driver and the visual angle formed so as to spread in a visual line direction through the window 3 when the window 3 is viewed from the viewpoint P1. In each of FIG. 6A and FIG. 7A, an area of the visual angle is exemplified by an area AR1 when cutting a three-dimensional visual angle in a plane in which the virtual image surface 1C exists. In each of FIG. 6A and FIG. 7A, four visual lines passing through a frame (four angles) of the window 3 when the display apparatus 10 is viewed from the viewpoint P1 are exemplified by a shape of a quadrangular pyramid. Furthermore, a field of view is exemplified by the rectangular area AR1 at a base of the quadrangular pyramid on the deeper side (front side of the vehicle) than the window 3. As illustrated in FIG. 6A and FIG. 7A, the rectangular area AR1 as the area of the visual angle formed so as to spread in the visual line direction through the window 3 is hardly overlapped with the virtual image surface 1C. That is, the line of sight of the driver is obstructed by the dashboard around the window 3 and the driver does not visually recognize the virtual image surface 1C.

Each of FIG. 6B and FIG. 7B illustrates a viewpoint P2 of the occupant in the passenger seat and the visual angle formed so as to spread in the visual line direction through the window 3 when the window 3 is viewed from the viewpoint P2. Also in each of FIG. 6B and FIG. 7B, an area of the visual angle is exemplified by a rectangular area AR2 when cutting a three-dimensional visual angle in a plane in which the virtual image surface 1C exists. As illustrated in FIG. 6B and FIG. 7B, the rectangular area AR2 as the area of the visual angle formed so as to spread in the visual line direction through the window 3 includes the virtual image surface 1C. Therefore, a line of sight of the occupant in the passenger seat is not obstructed by the dashboard around the window 3 and the occupant in the passenger seat visually recognizes the virtual image surface 1C.

Effect of Embodiment

As described above, the display apparatus 10 with the triangular prism structure has the first side surface, the second side surface, and the third side surface parallel to the central axis of the triangular prism. The mirror 2 is provided on the side of the inner surface of the first side surface of the triangular prism. The transparent display 1 with the back surface 1B visually recognizable from the side of the inner surface of the triangular prism is provided on the second side surface. The transparent window 3 is provided on the third side surface. In this structure, as described in FIG. 6B and FIG. 7B, the occupant in the passenger seat visually recognizes the virtual image surface 1C mirror-reversed on the mirror 2 through the transparent window 3. On the other hand, as described in FIG. 6A and FIG. 7A, the line of sight of the driver is obstructed by the dashboard and the driver does not visually recognize the virtual image surface 1C mirror-reversed on the mirror 2. Therefore, since the display apparatus 10 is brought into the second display state as shown in FIG. 1B, FIG. 2B, and FIG. 4B while the vehicle is travelling, the display apparatus 10 does not allow the driver to visually recognize the display content and allows the occupant in the passenger seat to visually recognize the display content.

In the display apparatus 10, each of the both bottom surfaces perpendicular to the central axis of the triangular prism, which is formed on both sides of each of the first side surface, the second side surface, and the third side surface parallel to the central axis, has an equilateral triangular shape. Therefore, the dimensions of the first side surface, the second side surface, and the third side surface are the same. As a result, the occupant in the passenger seat effectively visually recognizes the virtual image surface 1C mirror-reversed on the mirror 2 whose dimensions are the same as those of the transparent window 3.

On each of the both bottom surfaces, the rotation axis 6 that rotatably supports the triangular prism around the central axis is provided at the position of the center of gravity of the equilateral triangular shape. Since the triangular prism rotates around the rotation axis 6, the skin member 4 on a front side of the first side surface of the triangular prism, the front surface 1A of the transparent display 1 as the second side surface, and the transparent window 3 as the third side surface are selectively exposed. Therefore, the occupant in the passenger seat or the driver selectively visually recognizes the skin member 4 on the front side of the first side surface of the triangular prism, the front surface 1A of the transparent display 1 as the second side surface, and the transparent window 3 as the third side surface.

The transparent display 1 is a transparent plate display in which the display content displayed on the front surface 1A is reversed and visually recognized from the back surface 1B. On the virtual image surface 1C reflected in the mirror 2, the display content displayed on the front surface 1A is displayed. Thus, the occupant in the passenger seat visually recognizes the display content displayed on the front surface 1A on the virtual image surface 1C mirror-reflected on the mirror 2 through the transparent window 3.

The triangular prism structure is embedded inside of the instrument panel on a front side of a vehicle cabin and on a side of the passenger seat and is rotated by the rotation axis 6 so as to expose one of the first side surface, the second side surface, and the third side surface from the instrument panel. Therefore, the display apparatus 10 allows one of the skin member 4 on the front side of the first side surface of the triangular prism, the front surface 1A of the transparent display 1 as the second side surface, and the transparent window 3 as the third side surface to be exposed to the opening between the upper panel 4A and the lower panel 4B. As a result, the occupant in the passenger seat or the driver selectively visually recognizes the first side surface, the second side surface, and the third side surface.

In a state in which the third side surface is exposed from the instrument panel, the back surface 1B of the transparent display 1 is mirror-reversed on the mirror 2 and the display content on the front surface 1A of the transparent display 1 is visually recognized from the passenger seat through the window 3. Therefore, the display apparatus 10 allows the occupant in the passenger seat to visually recognize the display content on the front surface 1A of the transparent display 1 in a state in which the transparent display 1 is hidden by the instrument panel.

Furthermore, in the state in which the third side surface is exposed from the instrument panel, the display content on the front surface 1A of the transparent display 1 is obstructed by the instrument panel and is not visually recognized from the driver seat. Therefore, it is possible to suppress an influence of the display of the display apparatus 10 on driving of the driver.

Moreover, the back surface of the mirror 2 is covered with the same material as that of the instrument panel or the dashboard including the instrument panel to form the front surface of the first side surface. Since the front surface of the first side surface is exposed from the instrument panel, the opening of the instrument panel for embedding the display apparatus 10 is closed with the same material as that of the instrument panel or the dashboard including the instrument panel. As a result, the design of the instrument panel or the design of the dashboard including the instrument panel is uniformed, which results in improving designability.

While the invention has been shown and described in detail, the foregoing description is in all aspects illustrative and not restrictive. It is therefore understood that numerous other modifications and variations can be devised without departing from the scope of the invention.

What is claimed is:

1. A display apparatus with a structure of a triangular prism that has a first side surface, a second side surface, and a third side surface parallel to a central axis of the triangular prism, the display apparatus comprising:

a mirror being provided on a side of a back surface of the first side surface of the triangular prism, the back surface of the first side surface facing an inside of the triangular prism;

a display provided on the second side surface, the display visually recognizable from the inside of the triangular prism; and a transparent window provided on the third side surface.

2. The display apparatus according to claim 1, wherein each of bottom surfaces which is perpendicular to the central axis of the triangular prism and which is formed on either side, along the central axis, of the first side surface, the second side surface, and the third side surface, has an equilateral triangular shape.

3. The display apparatus according to claim 2, wherein on each of the both bottom surfaces, a rotation axis that rotatably supports the triangular prism around the central axis is provided at a position of a center of gravity of the equilateral triangular shape.

4. The display apparatus according to claim 1, wherein the display is a transparent plate display in which a display content displayed on a front surface of the display is reversed and visually recognized from a back surface of the display.

5. The display apparatus according to claim 3, wherein the structure of the triangular prism is embedded inside an instrument panel on a front side of a vehicle cabin and on a side of a passenger seat and is rotatable about the rotation axis so as to expose one of the first side surface, the second side surface, and the third side surface from the instrument panel.

6. The display apparatus according to claim 5, wherein in a state in which the third side surface is exposed from the instrument panel, a back surface of the display is mirror-reversed on the mirror and a display content on a front surface of the display is visually recognized from the passenger seat through the window.

7. The display apparatus according to claim 6, wherein in the state in which the third side surface is exposed from the instrument panel, the display content on the front surface of the display is obstructed by the instrument panel and is not visually recognized from a driver seat.

8. The display apparatus according to claim 5, wherein a back surface of the mirror is covered with a material which is same as a material of the instrument panel or a dashboard including the instrument panel to form a front surface of the first side surface, and by exposing the front surface of the first side surface from the instrument panel, an opening of the instrument panel for embedding the display apparatus is closed with the material.

9. A displaying method using a structure of a triangular prism that has a first side surface, a second side surface, and a third side surface parallel to a central axis of a triangular prism, the method comprising:

(a) providing a mirror on a side of a back surface of the first side surface of the triangular prism, the back surface of the first side surface facing an inside of the triangular prism;

(b) providing a display on the second side surface such that the display is visually recognizable from the inside of the triangular prism; and (c) providing, on the third side surface, a transparent window, wherein the structure of the triangular prism is embedded inside an instrument panel on a front side of a vehicle cabin and on a side of a passenger seat and is rotatable by a rotation axis including the central axis so as to expose one of the first side surface, the second side surface, and the third side surface from the instrument panel, in a state in which the third side surface is exposed from the instrument panel, a back surface of the display is mirror-reversed on the mirror and a display content on a front surface of the display is visually recognized from the passenger seat through the window, and in the state in which the third side surface is exposed from the instrument panel, the display content on the front surface of the display is obstructed by the instrument panel and is not visually recognized from a driver seat.

* * * * *